United States Patent
Gohel

(10) Patent No.: US 7,420,375 B2
(45) Date of Patent: Sep. 2, 2008

(54) METHOD FOR DIGITAL BUS TESTING

(75) Inventor: Tushar K. Gohel, Wakefield, MA (US)

(73) Assignee: Teradyne, Inc., North Reading, MA (US)

( * ) Notice: Subject to any disclaimer, the term of this patent is extended or adjusted under 35 U.S.C. 154(b) by 294 days.

(21) Appl. No.: 10/997,032

(22) Filed: Nov. 24, 2004

(65) Prior Publication Data

US 2005/0193275 A1    Sep. 1, 2005

Related U.S. Application Data

(62) Division of application No. 10/317,310, filed on Dec. 12, 2002, now Pat. No. 6,894,505.

(60) Provisional application No. 60/400,444, filed on Aug. 1, 2002.

(51) Int. Cl.
*G01R 31/02* (2006.01)
*G06F 13/14* (2006.01)

(52) U.S. Cl. ...................... 324/539; 710/305

(58) Field of Classification Search ............. 324/538, 324/539, 763; 710/305
See application file for complete search history.

(56) References Cited

U.S. PATENT DOCUMENTS

| | | | |
|---|---|---|---|
| 5,671,376 A * | 9/1997 | Bucher et al. | 710/305 |
| 6,703,825 B1 * | 3/2004 | Creek et al. | 324/158.1 |
| 2002/0087924 A1 * | 7/2002 | Panis et al. | 714/712 |

\* cited by examiner

*Primary Examiner*—Vincent Q. Nguyen
*Assistant Examiner*—Amy He
(74) *Attorney, Agent, or Firm*—Chester Cekala

(57) ABSTRACT

An interface for a bus test instrument is readily adaptable for testing a wide range of bus types. The interface includes a pair of transmit lines and a pair of receive lines. A transmitting circuit is adaptable for transmitting either single-ended or differential signals over the transmit lines, and at least one receiving circuit is adaptable for receiving either single-ended or differential signals from either the receive lines or the transmit lines. The flexible interface allows the testing of single-ended and differential busses, as well as busses that support both unidirectional and bidirectional communication.

9 Claims, 4 Drawing Sheets

METHOD FOR DIGITAL BUS TESTING

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable

BACKGROUND OF THE INVENTION

1. Field of the Invention

This invention relates generally to equipment for testing electronic devices and busses, and, more particularly, to test equipment that is adaptable for testing devices and digital busses covering a wide range of bus interface specifications.

2. Description of Related Art

The military and the commercial sector commonly employ digital busses for controlling electronic systems. Different types of busses are used in different applications. For instance, commercial aircraft commonly use ARINC 429 busses for avionics systems, while the military commonly uses MIL-STD-1553 busses for controlling aircraft and weapons systems. The commercial sector commonly uses RS-232 busses for computer applications. In addition, military and commercial entities often develop custom busses, with proprietary interface specifications and protocols, for enabling communication among different elements of in-house systems.

Manufacturers of devices for digital busses often use automatic test equipment (ATE) to verify device performance. Customarily, this test equipment is designed specifically for a particular bus type. For instance, specialized ARINC 429 instruments are employed for testing ARINC 429 devices, whereas specialized MIL-STD-1553 instruments are used for testing 1553 devices. Manufacturers of proprietary busses often develop custom test equipment for testing their custom bus devices. Alternatively, they may adapt general-purpose digital test equipment to suit their particular testing needs.

The specialization in bus test equipment is attributable in part to the fact that interface specifications for different bus types vary widely. Different busses can operate at different frequencies, edge speeds, and/or voltage levels. Busses can be unidirectional or bidirectional, single-ended or differential. Some busses provide handshaking and/or clock lines; some do not.

Despite these differences, we have recognized that the testing problems posed by digital busses are essentially similar across different types of busses, and that manufacturers could benefit from a more universal approach to bus testing.

BRIEF SUMMARY OF THE INVENTION

In one aspect, the present invention may be characterized as a method for testing digital busses. The method comprises the step of connecting a device under test to a test interface circuit, the test interface circuit having at least four nodes, a controller, a first transmitter coupled to the first node, a second transmitter coupled to a second node, a first receiver, and a second receiver. Additional steps include selectively configuring the first transmitter, second transmitter, first receiver and second receiver to a prescribed configuration; and selectively driving a first node and a second node to one or more programmable drive levels; and comparing inputs of the first receiver and the second receiver to one or more programmable thresholds. The method allows for transmitting both single-ended and differential signals through the first and second nodes to the device under test and receiving both single-ended and differential signals. The method also supports both unidirectional and bi-directional communication with the device under test.

These and other features, aspects and advantages of the present invention will become more apparent from consideration of the detailed description and drawings set forth below.

BRIEF DESCRIPTION OF THE DRAWINGS

Additional objects, advantages, and novel features of the invention will become apparent from a consideration of the ensuing description and drawings, in which.

DETAILED DESCRIPTION OF THE PREFERRED EMBODIMENT

Figure 1:
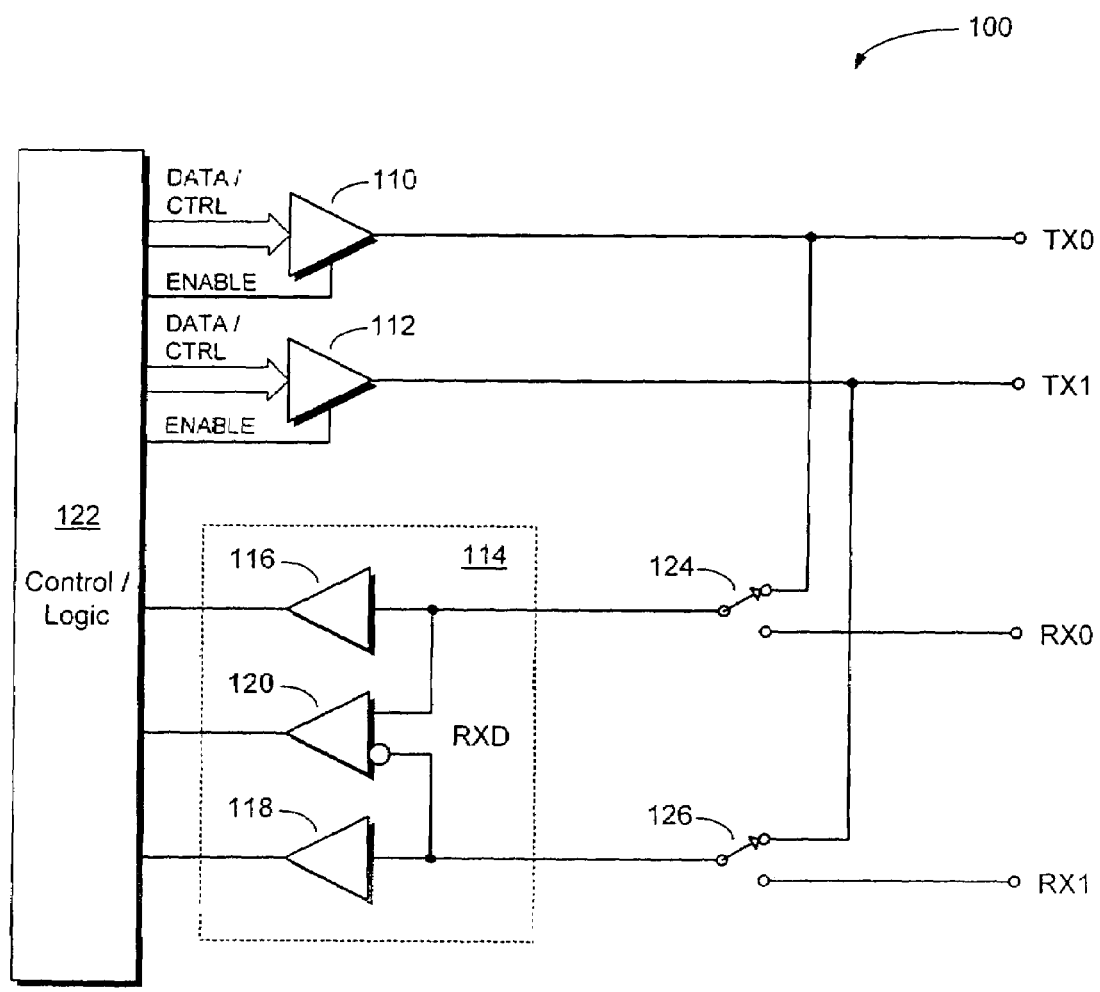
FIG. 1 is a simplified schematic of a flexible interface circuit for testing a wide range of digital busses and devices according to the invention.

FIG. 1 shows a first illustrative embodiment 100 of a flexible interface for testing digital busses according to the invention. The interface has first and second transmit lines, TX0 and TX1, and first and second receive lines, RX0 and RX1, for communicating with a device under test (DUT). First and second transmitters 110 and 112 respectively provide output signals to TX0 and TX1. A receiver circuit 114 includes first and second single-ended receivers 116 and 118 and a differential receiver 120. The single-ended receivers 116 and 118 each have an input, and the inputs are connectable, preferably as a pair, either to TX0 and TX1, or to RX0 and RX1, respectively. The differential receiver 120 has first and second inputs respectively coupled to the inputs of the first and second single-ended receivers 116 and 118, and generates an output signal proportional to the differential voltage between these inputs. The transmitters and receivers are configured via a control/logic section 122, which also receives the outputs of the receivers 116, 118, and 120.

Figure 2:
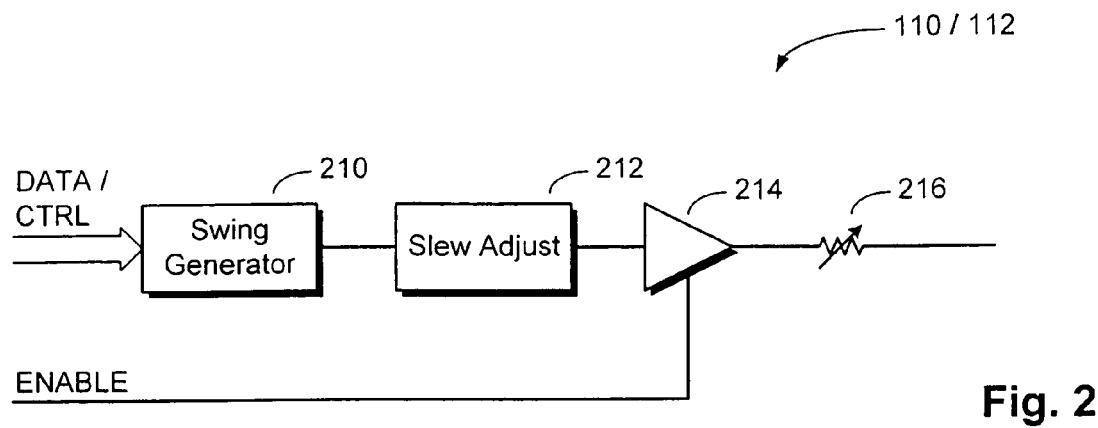
FIG. 2 is a more detailed schematic of a transmit circuit shown in FIG. 1.

FIG. 2 shows a more detailed view of one of the transmitters 110/112. Each transmitter preferably includes a swing generator 210, such as a digital-to-analog converter (DAC), which receives data indicative of a desired transmitter output voltage. The swing generator 210 may also be implemented by switching reference voltages using bus switches or similar devices. Preferably, the swing generator can produce at least three different voltage levels, although this is not required. The output of the swing generator 210 is coupled to a slew rate adjusting circuit 212, and the output of the slew rate adjusting circuit is coupled to a low gain driver 214. The low gain driver 214 is preferably tri-statable (i.e., its output can be placed in a high impedance state), under the control of a control signal (ENABLE). An example of a suitable driver is disclosed in U.S. patent application Ser. No. 10/113,179, entitled "DRIVER CIRCUIT EMPLOYING HIGH-SPEED TRI-STATE FOR AUTOMATIC TEST EQUIPMENT," which is hereby incorporated by reference in its entirety. An impedance 216 is preferably coupled in series with the output of the driver 214 for providing a series termination. In the preferred embodiment, the impedance 216 is selectable with values of 3-ohms, 50-ohms, 75-ohms, and 100-ohms. Other impedances can be used; however, the above values are believed to accommodate the requirements of most digital busses.

To operate a transmitter (110 or 112), the swing generator 210 is programmed with a new value that produces an output step having high slew rate. The slew rate adjust circuit 212 slows the slew rate (preferably programmably) to produce an output signal having a desired slew rate. The low gain driver 214 preferably provides both voltage and current gain and drives the boosted signal via the selectable impedance 216.

Figure 3:
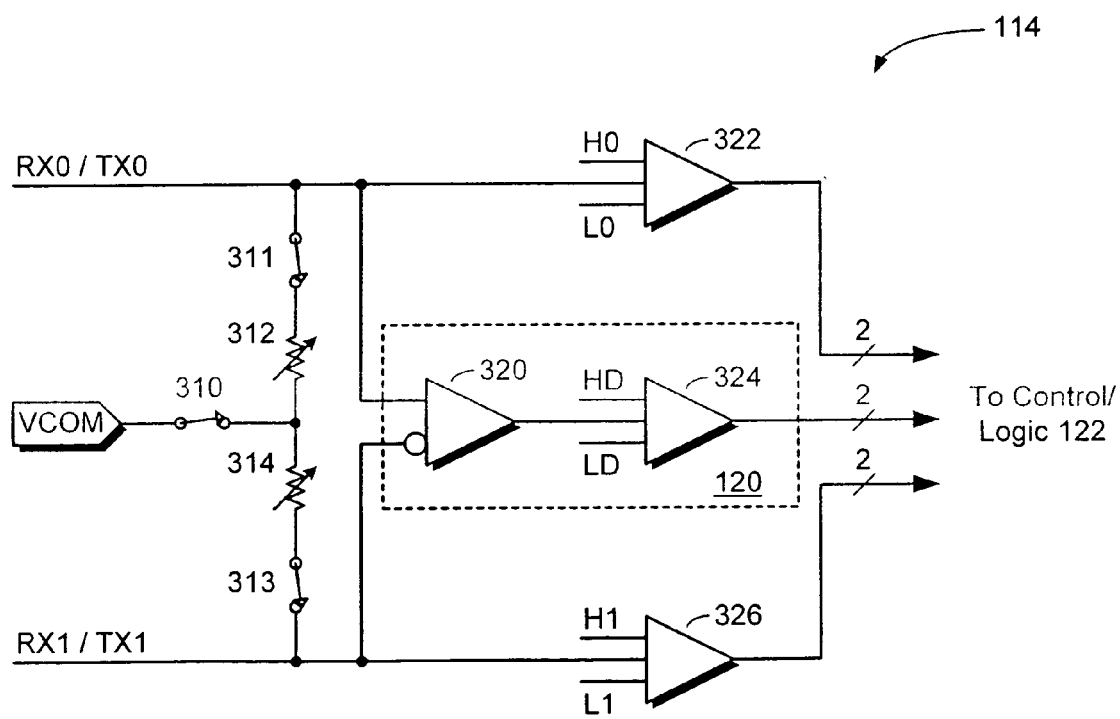
FIG. 3 is a more detailed schematic of a receive circuit as shown in FIG. 1.

FIG. 3 shows a more detailed view of the receiver 114 of FIG. 1. Lines RX0/TX0 and RX1/TX1 are respectively coupled to inputs of single-ended comparators 322 and 326. These comparators 322 and 326 are preferably window comparators, i.e., they compare their inputs with first and second reference values (H0, L0 and H1, L1) to generate 2-bit output signals indicative of the relative levels of the input signals and the references. Lines RX0/TX0 and RX1/TX1 are also coupled to inputs of the differential comparator 120. The differential comparator includes an analog differential amplifier 320 and a third comparator 324. The amplifier preferably has a low gain and produces an output signal proportional to a difference between the signal levels at is inputs. The third comparator 324 is preferably also a window comparator, which produces a 2-bit output indicative of the relative level of its input and its references, HD and LD. The differential amplifier thus allows the voltage difference between its input signals to be compared with threshold levels, independently of the common-mode voltage of its input signals.

The outputs of the window comparators 322, 324, and 326 are preferably provided to the control/logic section 122. The control/logic section preferably includes digital sampling circuitry for sampling the outputs of comparators 322, 324, and 326 at predetermined instants in time, and circuitry for storing and reporting results. Although the comparators 322, 324, and 326 are preferably window comparators, other types of comparators can alternatively be used, for providing any number of bits of output data indicative of the respective input voltages.

The receiver 114 preferably also includes termination impedances, such as impedances 312 and 314. These impedances are preferably connectable via switches 311 and 313, respectively, and are selectable with values of 25-ohms, 37.5-ohms, 50-ohms, 75-ohms, and 100-ohms, for accommodating a wide range of bus types. In the preferred embodiment, a switch 310 selectively connects a programmable reference level, VCOM, to a node at the junction of the impedances 312 and 314. When the switch 310 is open, the inputs to the receiver 114 are terminated with respect to each other. When the switch 310 is closed, the inputs are each individually terminated to VCOM. Where less flexibility is required, such as for receiving handshaking signals, a simple resistive load could be supplied for terminating signals relative to VCOM, ground, or some other DC voltage.

Figure 4:
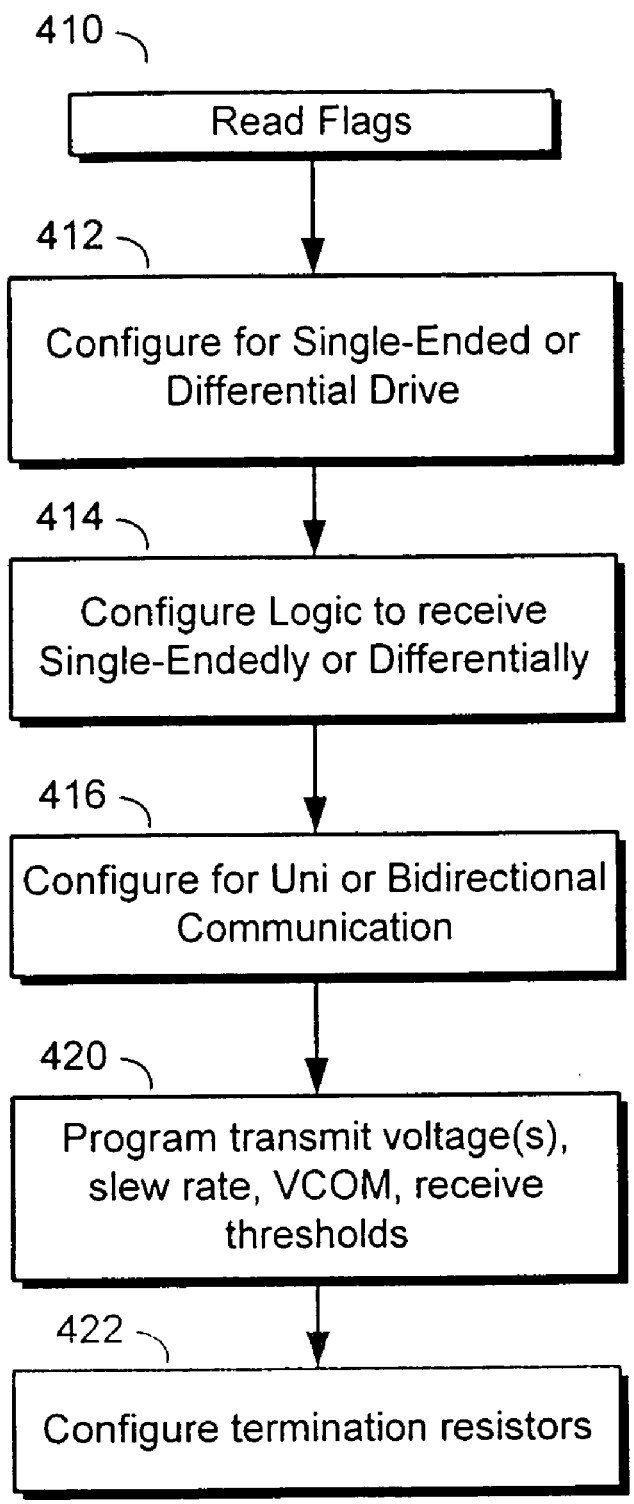
FIG. 4 is a flowchart showing a process for operating the flexible interface of FIG. 1.

FIG. 4 shows a process employed by the control/logic section 122 for configuring the flexible interface 100 to suit the requirements of any of a wide range of bus types. Although the steps shown in FIG. 4 appear in a particular sequence, it should be understood that the order of the steps is not critical and can be varied within the scope of the invention. For instance, the steps can be executed in a different order, and some or all of the steps may be executed simultaneously.

At step 410, the control/logic section 122 reads a series of flags. The flags indicate the signals from a DUT that support single-ended communication and those that support differential communication. The flags also indicate the signals that support unidirectional communication and those that support bidirectional communication. For differential signals, the control/logic section 122 configures single-ended transmitters for driving differential signals (step 412). This step generally entails preparing to program the swing generators 210 associated with the two transmitters 110 and 112 so that they vary in opposition with each other, i.e., to values that change with a 180-degree phase relationship. At step 414, the control/logic section prepares to respond to the output of the differential comparator 120 (step 416), rather than to the outputs of the single-ended comparators 116 and 118, closes switches 111 and 113, and opens the switch 310, for terminating the receive lines to each other. For signals that support single-ended communication, the transmitter(s) are configured for single-ended drive and/or the receiver(s) are set for single-ended receive. The switch 310 is closed, to terminate the receive lines to VCOM. Switches 111 and 113 can be left open if no termination is desired.

For bus signals that support bidirectional communication (step 416), the control/logic section 122 configures the interface 100 for bidirectional communication (step 416). In the embodiment 100, this involves configuring one or both switches 124 and 126 to couple the inputs of the receiver 114 to the transmit lines, TX0 and TX1. Operation requires that one input be coupled to a transmit line for single-ended communication, but that both inputs be coupled to the transmit lines for differential communication.

If the signal supports unidirectional communication, the control/logic section 122 configures the interface 100 for unidirectional communication. In the embodiment 100, this involves configuring one or both switches 124 and 126 to couple the inputs of the receiver 114 to the receive lines, RX0 and RX1. Operation requires that one input be coupled to a receive line for single-ended communication, but that both inputs be coupled to the receive lines for differential communication.

At step 420, the voltages for the swing generators 210 are programmed, as well as the transmit slew rate, VCOM (if necessary), and the threshold values for the receivers 114. Termination impedances are selected (step 422) for both transmitters and receivers.

As is known, digital busses often require control lines, such as handshaking lines, clock lines, and the like, in addition to data lines. The interface 100 can preferably accommodate these special purpose signals. Data and/or control lines can be sent to a DUT via TX0 and/or TX1, and can be received from the DUT via RX0 and/or RX1. For bidirectional busses, data and/or control lines can be transmitted and received via TX0 and/or TX1.

In the preferred embodiment, the flexible interface forms part of a signal interface for a bus test instrument, which is adaptable for testing a wide variety of bus types and digital signals. The bus test instrument is preferably a module that plugs into a card cage, such as a VXI card cage, of an automatic test system. The bus test instrument is controllable via software, such as test programs that run on a host computer. The flexible interface is not limited to use with an instrument in a test system, however. It can also be used in other test circuits or other circuits that interface with one or more types of busses or digital signals.

The preferred embodiment of the invention primarily focuses on testing serial busses. Multiple copies of the interface 100 are preferably used for accommodating the numerous signals that different serial busses may require. Some serial busses require multiple bits of data, and some require multiple control lines. We have discovered that three copies of the interface 100 are generally adequate for testing most types of serial devices. These different copies can be operated together, for testing busses that require greater than two transmit lines and/or greater than two receive lines. In the preferred embodiment, four different groups of three interfaces each are provided for testing multiple devices.

The I/O for each group of interface circuits is preferably provided on a single I/O connector for facilitating connection to a single bus device. In the preferred embodiment, each group of three interfaces 100 is provided on a single 26-pin D-Sub connector, and the bus test instrument includes four such connectors at its front panel.

A benefit of the interface 100 is that it accommodates a wide range of busses while requiring little connector space. This makes more connector space available for other interfaces of the same type, or for other instruments in a test system. The interface also requires little circuit board space, which frees up space for providing other functionality.

ALTERNATIVES

Figure 5:
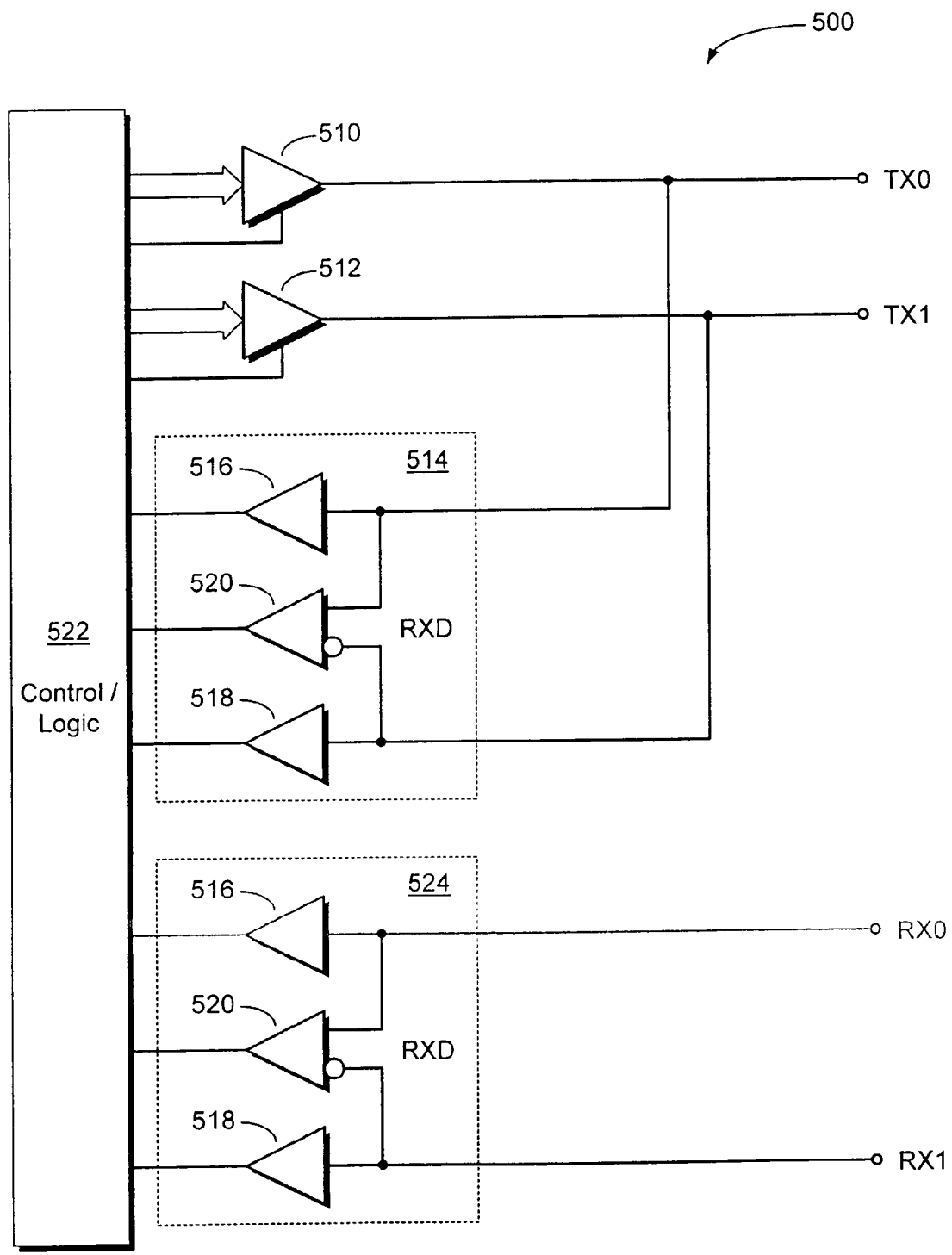
FIG. 5 is a simplified schematic of an alternative embodiment of the flexible interface circuit according to the invention.

Having described one embodiment, numerous alternative embodiments or variations can be made. FIG. 5 shows an alternative embodiment 500 of the flexible interface. The interface 500 has the same number of I/O connections as the interface 100. It differs, however, in that it provides two receiver circuits, one for bidirectional communication (514) and one for unidirectional communication (524). The embodiment 500 thus eliminates the switches 124 and 126 while preserving the functionality of the interface 100.

The three copies of the flexible interface (or however many are used per group) may be identical, but this is not required. For example, one or more copies may be dedicated to sending and/or receiving handshaking signals. This copy may include simpler circuitry with less flexibility than other copies, thereby enabling a cost savings without severely impacting effectiveness.

In addition, although the description provided herein refers primarily to serial bus applications (MIL-STD-1553, ARINC 429, RS-232), the flexible interface and methods described herein are also applicable for use with parallel busses or other digital signals. For use with parallel busses, greater than three copies of the flexible interface may be used to accommodate greater numbers of data bits simultaneously, and I/O connectors having greater numbers of terminals may be used.

While the invention has been particularly shown and described with reference to the preferred embodiments thereof, it will be understood by those skilled in the art that various changes in form and detail may be made therein without departing from the spirit and scope of the invention.

What is claimed is:

1. A method for testing digital busses, comprising:
   connecting a device under test to at least four nodes in a test interface circuit, the test interface circuit having a controller, a first transmitter coupled to a first node, a second transmitter coupled to a second node, a first receiver, and a second receiver;
   selectively configuring the first transmitter, second transmitter, first receiver and second receiver to a prescribed configuration by
      selectively coupling the first receiver to either a third node or the first node; and
      selectively coupling the second receiver to either a fourth node or the second node;
   selectively driving the first node and the second node to one or more programmable drive levels;
   comparing inputs of the first receiver and the second receiver to one or more programmable thresholds.

2. The method of claim 1 wherein the step of selectively configuring further comprise:
   configuring the first transmitter and the second transmitter as two unidirectional single-ended transmitters adapted to drive the respective nodes to at least two programmable drive levels; and
   configuring the first receiver and second receiver as two unidirectional single-ended receivers adapted to compare their respective input signals with at least one programmable threshold.

3. The method of claim 1 wherein the step of selectively configuring further comprise:
   configuring the first transmitter and the second transmitter as two unidirectional single-ended transmitters adapted to drive the respective nodes to at least two programmable drive levels; and
   configuring the first receiver and second receiver as one unidirectional differential receiver adapted to compare a differential input to at least one programmable threshold.

4. The method of claim 1 wherein the step of selectively configuring further comprises:
   configuring the first transmitter and the second transmitter as one unidirectional differential transmitter adapted to drive the respective nodes to at least two programmable drive levels; and
   configuring the first receiver and second receiver as two unidirectional single-ended receivers adapted to compare their respective input signals with at least one programmable threshold.

5. The method of claim 1 wherein the step of selectively configuring further comprises:
   configuring the first transmitter and the second transmitter as one unidirectional differential transmitter adapted to drive the respective nodes to at least two programmable drive levels; and
   configuring the first receiver and second receiver as one unidirectional differential receiver adapted to compare a differential input to at least one programmable threshold.

6. The method of claim 1 wherein the step of selectively configuring further comprises:
   configuring the first transmitter and the second transmitter as two bi-directional single-ended transmitters adapted to drive the respective nodes to at least two programmable drive levels; and
   configuring the first receiver and second receiver as two bi-directional single-ended receivers adapted to compare the respective inputs to at least one programmable threshold.

7. The method of claim 1 wherein the step of selectively configuring further comprises:
   configuring the first transmitter and the second transmitter as one bi-directional differential transmitter adapted to drive the respective nodes to at least two programmable drive levels; and configuring the first receiver and second receiver as one bi-directional differential receiver adapted to compare a differential inputs to at least one programmable threshold.

8. The method of claim 1 wherein the first transmitter and the second transmitter are tri-statable.

9. The method of claim 1 wherein the step of selectively driving further comprises the step of adjusting a slew rate of transmitted signals to a prescribed slew rate.

* * * * *